United States Patent [19]

Hiroshima

[11] Patent Number: 4,910,747
[45] Date of Patent: Mar. 20, 1990

[54] ION LASER
[75] Inventor: Masaaki Hiroshima, Tokyo, Japan
[73] Assignee: NEC Corporation, Japan
[21] Appl. No.: 346,805
[22] Filed: May 3, 1989
[30] Foreign Application Priority Data
  May 9, 1988 [JP] Japan ................................. 63-113199
[51] Int. Cl.[4] ............................................. H01S 3/097
[52] U.S. Cl. ..................................................... 372/86
[58] Field of Search ..................................... 372/86, 38
[56] References Cited

U.S. PATENT DOCUMENTS 4,698,819 10/1987 Hirth et al. ............................ 372/86
4,734,841  3/1988 Elliott et al. .......................... 372/86

Primary Examiner—William L. Sikes
Assistant Examiner—Robert E. Wise

[57] ABSTRACT

An ion laser comprises a main circuit for maintaining the discharge state of an ion laser tube, and an auxiliary circuit for adding an auxiliary DC voltage to a main DC voltage of the main circuit. The impedance of the auxiliary circuit is much larger than that of the main circuit when the ion laser tube has been discharging. At the starting of the ion laser tube discharge, a starter circuit drives the ion laser tube to discharge in accordance with an added voltage of the main and auxiliary DC voltages. Thereafter, the auxiliary circuit is substantially separated from the main circuit due to the difference of the impedances. As a result, surplus power which is not consumed in the ion laser tube is decreased to be negligible.

2 Claims, 1 Drawing Sheet

ION LASER

FIELD OF THE INVENTION

The invention relates to an ion laser, and more particularly to an ion laser which is applicable to a light source for a laser printer, a color scanner etc.

BACKGROUND OF THE INVENTION

One type of a conventional ion laser comprises an AC power source having an output voltage of, for instance, 100 V, an auto-transformer for stepping the output voltage up to, for instance, 115 V to 120 V, a rectifying circuit for rectifying the AC power of the AC stepped-up voltage to DC power, a capacitor for smoothing the DC power to produce a DC power having less ripple, a starter circuit for producing a high voltage pulse to be applied to an ion laser tube, a choke coil avoiding the application of the high voltage pulse to the rectifying circuit, a low voltage portion of the starter circuit etc., and a power transistor path bank for controlling the discharge current of the ion laser tube.

In operation, AC power is supplied from the AC power source, and the voltage of the AC power is stepped up from 100 V to, for instance, 120 V by the auto-transformer. Then, the AC power is rectified to provide DC power. The DC power is smoothed to provide DC power having less ripple by the smoothing capacitor. Thus, the smoothed DC power is supplied to the starter circuit, and also supplied through the choke coil to the on laser tube. Assuming that the discharge starting voltage of the ion laser tube is 2 KV, a high voltage impulse of, for instance, 3 KV is produced in the starter circuit. The high voltage impulse is applied across an anode and a cathode of the ion laser tube from the starter circuit which starts operating by receiving the stepped-up DC voltage, so that the ion laser tube is driven to discharge, while the high voltage impulse is not applied to the low voltage portion of the starter circuit, the rectifying circuit etc. in the presence of the choke coil. Thus, the ion laser tube continues to discharge by receiving the smoothed DC power. In this circumstance, the discharge current and the discharge voltage of the ion laser tube are, for instance, 8 A (usually ranging 5 A to 12 A), and 90 V, respectively. Therefore, the whole DC power is not consumed in the ion laser tube, and the surplus DC power is consumed in the power transistor path bank.

In the conventional ion laser, however, there is a disadvantage that the auto-transformer is of a large power capacity, thereby being large in size and heavy in weight, because the discharge of the ion laser tube is a large current.

There is further disadvantage that a power efficiency is decreased, because the surplus power is consumed in the poewr transistor path bank, thereby radiating heat therefrom.

SUMMARY OF THE INVENTION

Accordingly, it is an object of the invention to provide an ion laser which is small in size, and light in weight.

It is a further object of the invention to provide an ion laser in which a power efficiency is increased.

According to the invention, an ion laser comprises,
an ion laser tube for radiating light;
an AC power source for supplying an AC power of a first predetermined voltage;
a main circuit for providing a first DC power of a second predetermined voltage dependent on said first predetermined voltage, said main circuit being connected to said ion laser tube and having a first predetermined impedance when said ion laser tube to discharges;
an auxiliary circuit for providing a second DC power of third predetermined voltage which is stepped down from said first predetermined voltage to be lower than said second predetermined voltage, said auxiliary circuit being connected to said ion laser tube and having a second predetermined impedance greatly larger than said first predetermined value of impedance;
a starter circuit for producing a high voltage impulse in accordance with said first DC power of said second predetermined voltage and said second DC power of said third predetermined voltage, said high voltage impulse having the voltage larger than a discharge starting voltage of said ion laser tube; and
a control means for controlling a discharging current of said ion laser tube;
wherein said ion laser tube is driven in accordance with the application of said high voltage impulse thereto, and discharges with a predetermined discharging current in accordance with the application of said third predetermined voltage of said second DC power, said predetermined discharging current being controlled by said control means.

BRIEF DESCRIPTION OF DRAWINGS

The invention will be explained in more detail in conjunction with appended drawings wherein.

DESCRIPTION OF PREFERRED EMBODIMENTS

Before explaining an ion laser according to the invention, the aforementioned conventional ion laser will be explained.

Figure 1:
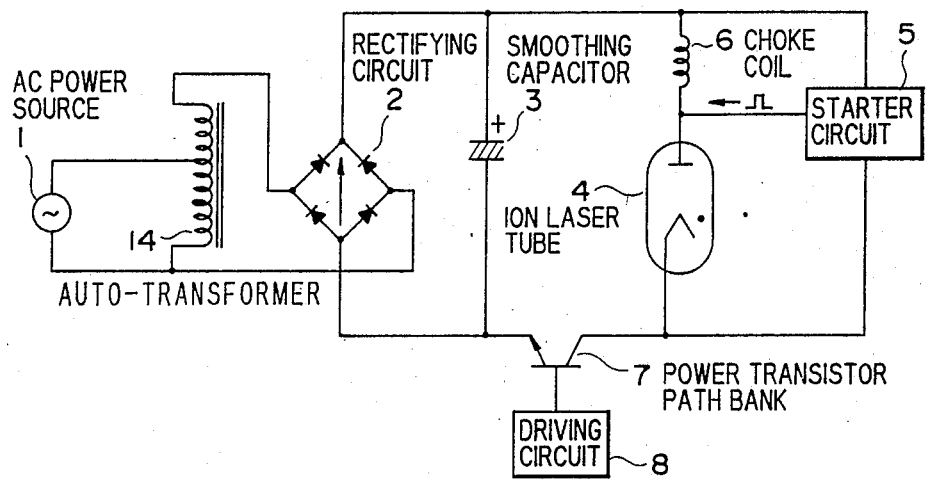
FIG. 1 is a circuitry diagram of a conventional ion laser.

FIG. 1 shows the conventional ion laser which comprises an AC power source 1 having an output voltage of 100 V, an auto-transformer 14 for stepping-up the output voltage, for instance, from 100 V to 120 V, a rectifying circuit 2 including rectifying diodes for rectifying the stepped-up AC power to provide a DC power, a smoothing capacitor 3 for smoothing the DC power to provide a DC power having less ripple, a starter circuit 5 for producing a high voltage impulse of, for instance, 3 KV to be applied to an ion laser tube 4 having a discharge starting voltage of, for instance, 2 KV, a choke coil 6 avoiding the application of the high voltage impulse to the rectifying circuit 2, a power transistor path bank 7 for controlling the discharge current of the ion laser tube 4, and a driving circuit 8 for producing a control signal to drive the power transistor path bank 7 in accordance with the discharge current or the output of the ion laser tube 4.

Operation, disadvantages etc. of the conventional ion laser are explained before. Therefore, these are not explained here.

Figure 2:
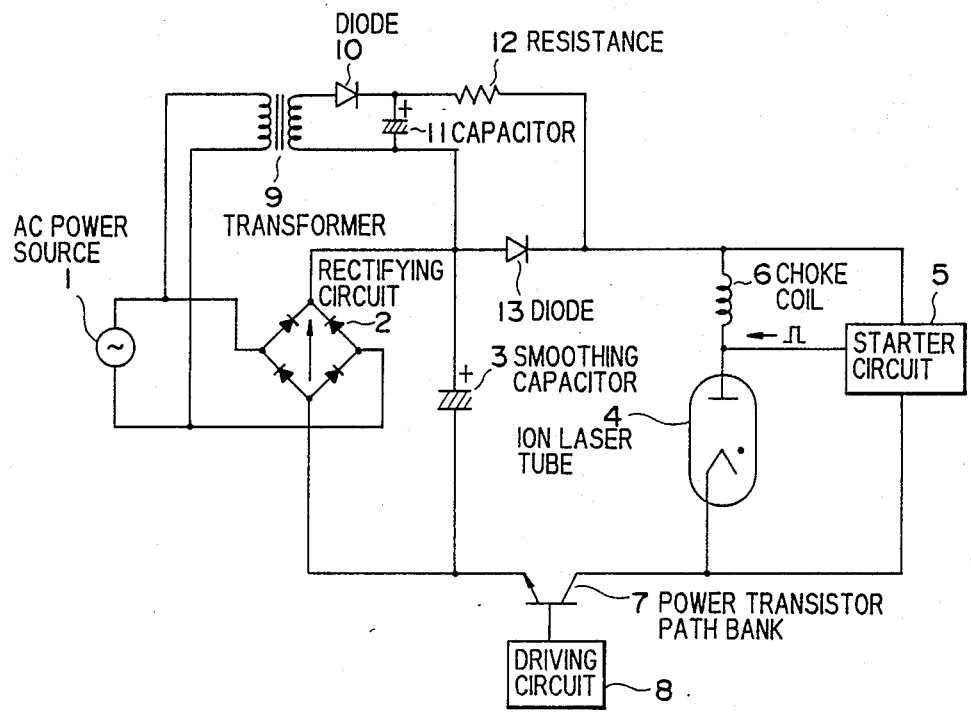
FIG. 2 is a circuitry diagram of an ion laser in an embodiment according to the invention.

Next, an ion laser in an embodiment according to the invention will be explained. FIG. 2 shows the ion laser comprising an AC power source 1, a rectifying circuit 2, a smoothing capacitor 3, an ion laser tube 4, a starter circuit 5, a choke coil 6, a power transistor path bank 7, and a driving circuit 8, which are the same as those explained in FIG. 1. The ion laser further comprises a transformer 9 for stepping down an output voltage of the AC power source 1 from 100 V to, for instance, 20 V, a diode 10 for rectifying an output of the transformer 9, a capacitor 11 which is charged in accordance with an output of the diode 10 to provide a low voltage DC power, a resistance 12 of, for instance, 2 KΩ for limiting the current to be supplied to the starter circuit 5, and a diode 13 for adding the voltage produced in the added circuit including the transformer 9, the diode 10, and the capacitor 11 to a voltage produced across terminals of the smoothing capacitor 3 to provide a voltage of, for instance, 120 V which is applied to the starter circuit 5. The resistance value "2 KΩ" of the resistance 12 is approximately 222 times the impedance value of, for instance, 9Ω of a main circuit including the rectifying circuit 2, the ion laser tube 4, the power transistor path bank 7 etc. when the ion laser tube 4 has been discharging with a predetermined discharging current.

In operation, AC power is supplied from the AC power source 1 to the rectifying circuit 2 and the transformer 9. The AC power is rectified by the rectifying circuit 2, and then smoothed by the smoothing capacitor 3, so that the rectified and smoothed DC power is produced in the main circuit. On the other hand, the voltage "100 V" of the AC power is stepped down to 20 V, and the stepped-down voltage is rectified to provide the low voltage DC power through the diode 10 and the capacitor 11 in the added circuit. As a result, DC currents are supplied through the diode 13 and the resistance 12 to the starter circuit 5, respectively, in accordance with the rectified and smoothed voltage in the main circuit and the stepped-down voltage in the added circuit, so that the starter circuit 5 is driven, thereby applying the high voltage impulse of, for instance, 3 KV across an anode and a cathode of the ion laser tube 4 having the discharge starting voltage of, for instance, 2 KV. Accordingly, the ion laser tube 4 discharges with a predetermined discharging current, the value of which is determined by the power transistor path bank 7 controlled in accordance with the control signal of the driving circuit 8. In this circumstance, the impedance of the main circuit is decreased from the non-limited value to the aforementioned value of 9Ω. For this reason, the impedance value including the resistance value of 2 KΩ in the added circuit becomes much larger than that of the main circuit, so that the added circuit is substantially separated from the main circuit. Therefore, load current of the ion laser tube 4 flows substantially based on the aforementioned rectified and smoothed voltage produced by the rectifying circuit 2 and the smoothing capacitor 3. As a result, the surplus DC power which is not consumed in the ion laser tube is decreased substantially to a negligible value.

As described above, there is an advantage in the invention that precise and stable operation of the starter circuit 5 is expected simply by adding the added circuit including the transformer 9 of several VA, the diode 10, and the resistance 12 of a large resistance value to the main circuit. Furthermore, no large margin is necessary to consider in the rectified and smoothed DC power of the main circuit relative to a discharge voltage of the ion laser tube 4. Therefore, the ion laser can be small in size, light in weight, and lowered in manufacturing cost.

Although the invention has been described with respect to specific embodiment for complete and clear disclosure, the appended claims are not to thus limited but are to be construed as embodying all modifications and alternative constructions that may occur to one skilled in the art which fairly fall within the basic teaching herein set forth.

What is claimed is:

1. An ion laser comprising:
   an ion laser tube for radiating light;
   an AC power source for supplying an AC power of a first predetermined voltage;
   a main circuit for providing a first DC power of a second predetermined voltage intrinsically dependent on said first predetermined voltage, said main circuit being connected to said ion laser tube and having a first predetermined impedance when said ion laser tube discharges;
   an auxiliary circuit for providing a second DC power of a third predetermined voltage which is stepped down from said first predetermined voltage to be lower than said second predetermined voltage, said auxiliary circuit being connected to said ion laser tube and having a second predetermined impedance much larger than said first predetermined impedance;
   a starter circuit for producing a high voltage impulse in accordance with said first DC power of said second predetermined voltage and said second DC power of said third predetermined voltage, said high voltage impulse having a voltage larger than the discharge starting voltage of said ion laser tube; and
   a control means for controlling the discharging current of said ion laser tube wherein said ion laser tube is driven in accordance with the application of said high voltage impulse thereto and then discharges with a predetermined discharging current in accordance with the application of said third predetermined voltage of said second DC power, said predetermined discharging current being controlled by said control means.

2. An ion laser according to claim 1 wherein said auxiliary circuit includes
   a transformer for stepping down said first predetermined voltage to said third predetermined voltage;
   means for rectifying an output of said transformer, said means including a diode and a capacitor; and
   a resistance for limiting current supplied to said starter circuit, said resistance providing said second predetermined impedance.

* * * * *